July 3, 1951 W. HENNINGER ET AL 2,558,953

RECORD CONTROLLED REGISTER ACTUATING MECHANISM

Filed March 20, 1948

INVENTORS;
*William Henninger,*
*Herbert J. Hollsberg.*

BY *Edward R. Sounders*
AGENT

Patented July 3, 1951

2,558,953

UNITED STATES PATENT OFFICE 2,558,953

RECORD CONTROLLED REGISTER ACTUATING MECHANISM

William Henninger, Ridgewood, N. J., and Herbert J. Hollsberg, Ridgewood, N. Y., assignors to International Business Machines Corporation, New York, N. Y., a corporation of New York Application March 20, 1948, Serial No. 16,008

3 Claims. (Cl. 74—142)

The present invention relates to an improved means for operating registers, counters or the like of the type which are adapted to be driven in one direction to increase the reading of the device and in the opposite direction to decrease the reading thereof. Registers of this class are commonly known in the art as two-way registers and in connection with the use of such registers it is desirable that the mechanism employed be adapted to operate the register in either direction at will.

The improved register-operating device comprising the present invention is readily adapted to be operated by electromagnetic means which in turn is capable of being operated under the control of a perforated record card, all in a manner that will be made clear presently as the nature of the invention is better understood.

It is among the principal objects of the invention to provide an electromagnetically operated record controlled actuating means for registers which not only is reversible to operate the register in either direction, but which will operate in either instance to advance or index the register one step at a time with no danger of overthrowing, regardless of the speed of operation of the device. It is a similar and related object of the invention to provide such a register actuating means which will operate at each actuation thereof to bring the register to a precise predetermined position so that the counter wheels associated with the register will always occupy a definite angular relationship with respect to the register casing window or opening through which they are viewed, such relationship serving at all times to maintain the numerals or other indicia on the counter wheels in exact alignment.

The provision of a register operating mechanism which is extremely simple in its construction; one which is comprised of a minimum number of moving parts and which, as a consequence, is unlikely to get out of order; one which is rugged and durable and, therefore, is possessed of a long life; one in which any of the various parts thereof may be constructed of light sheet metal stampings and which, as a consequence, is inexpensive to manufacture; and one which otherwise is well adapted to perform the services required of it, are further desiderata that have been borne in mind in the production and development of the present invention.

Other objects of the invention will be pointed out in the following description and claims and illustrated in the accompanying drawings, which disclose, by way of example, the principle of the invention and the best mode, which has been contemplated, of applying that principle.

In the drawings.

In all of the above described views like characters of reference are employed to designate like parts throughout.

Figure 3:
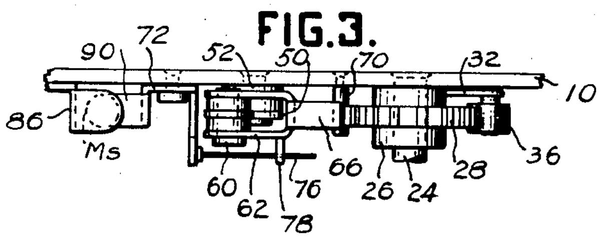
Fig. 3 is a top plan view of the device.

Referring now to the drawings in detail, the various moving parts of the register-operating mechanism are mounted upon a base plate 10 on which there is mounted a bracket 12 which serves to support thereon a conventional two-way or reversible register which is designated in its entirety at 14 and which includes the usual counter or indicator wheels 16 having numerical indicia 18 printed, stamped or otherwise formed thereon and which are adapted to be viewed through a rectangular window 20 formed in the casing 22 of the register. The register 14 may be of any well known type in which a plurality of indicator wheels is used, each wheel being adapted by its rotation to actuate the wheel of the next higher order when said first wheel passes from its maximum indication to its zero indication or vice versa.

The units indicator wheel 16 is operatively connected to an actuating sleeve 24 rotatably mounted on a stud or pin 25 supported from the base plate 10. The sleeve 26 has mounted thereon a ratchet disc 28 by means of which, as hereinafter described, the units order indicating wheel 16 may be turned or indexed by a stepping motion to expose at the window 20 in the casing 22 one of the numerals or indicia 18 on the periphery of the wheel.

The ratchet disc 28 has formed on the periphery thereof a series of substantially rectangular teeth 30, of which there are in the present instance ten in number, one for each of the indicia or numerals 18 provided on the periphery of each of the counter wheels 16. A holding detent in the form of a lever 32 is pivoted medially of its ends as at 34 and carries a roller 36 at one end thereof, the roller 36 being of sufficient diameter as to be capable of bearing against the outer ends of any two adjacent ratchet teeth 30 to hold the ratchet disc 28 in any one of ten definite angular positions corresponding to the equal circumferential spacing of the indicia 18 on the counter wheel 16. A spring 38 normally biases the lever 32 in a counter-clockwise direction to maintain the roller 36 in contact with the ratchet disc 28.

Figures 1, 2:
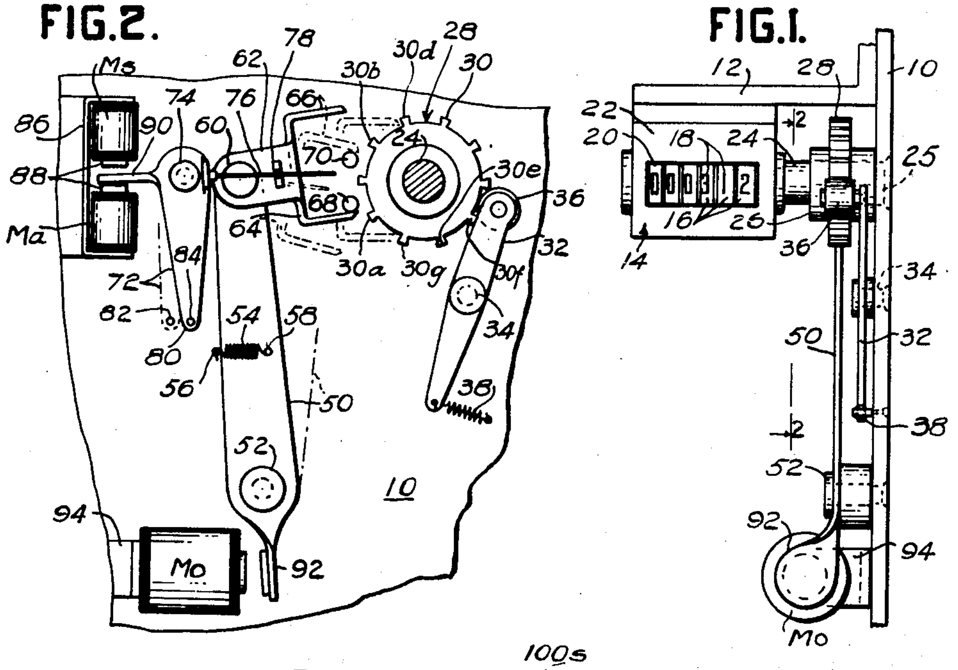
Fig. 1 is a side elevational view of a register actuating device constructed in accordance with the principles of the present invention.
Fig. 2 is a sectional view taken substantially along the line 2—2 of Fig. 1.

An operating lever 50 is pivoted as at 52 near one end thereof and is normally biased in a counter-clockwise direction by means of a spring 54. The spring 54 has one end connected to a stud 56 projecting outwardly from the base plate 10 and has its other end connected to a similar stud 58 carried on the lever 50. The stud 56 serves as a limit stop which determines the retracted position of the lever 50. The upper end of the lever 50, as viewed in Fig. 2, has pivotally connected thereto as at 60 a yoke member 62 which is formed with a pair of spaced parallel extending yoke arms or pawl fingers 64 and 66, each of which is capable of operating in the manner of a pawl to engage one of the teeth 30 on the ratchet disc 28 to advance or index the latter. The pivoted yoke 62 is capable of movement from its full line position, as shown in Fig. 2 wherein the pawl fingers 64 bear against a limit stop 68 in the form of a stud projecting outwardly from the plate 10, to its dotted line position wherein the pawl finger 66 bears against a limit stop 70 similar to the limit stop 68. The yoke 62 operates as a double acting pawl to index the ratchet wheel 28 in a manner that will be apparent presently.

A change-over or reversing member 72 is in the form of a lever, which is pivoted as at 74, and which carries a forwardly extending spring finger 76 in the form of a hardened spring steel wire, the free end of which projects through a bifurcated lug or bracket 78 mounted on the yoke member 62. The lever 72 is in itself of a yielding nature and its free end is inherently biased against the face of the base plate 10 and is formed with a friction lug 80 which is punched outwardly in the metal of the lever 72 and which is adapted to selectively cooperate with a pair of small apertures 82 and 84 formed in the base plate 10 to determine the two operating positions of the lever.

The lever 72 is thus movable from its full line position, as shown in Fig. 2, to its dotted line position and vice versa. In the former position of the lever the steel spring finger 76, operating on the bifurcated bracket 78, serves to tilt the yoke member 62 in a counter-clockwise direction to cause the pawl finger 64 to engage the stop 68. In its dotted line position the spring finger 76 urges the yoke member 62 to its other extreme position wherein the pawl finger 66 engages the stop 70.

Shifting of the lever 72 from one position to the other is controlled under the influence of a pair of electromagnets *Ma* and *Ms* which may be mounted on a common bracket 86 supported on the base plate 10. The magnets *Ma* and *Ms* are provided with common cores 88 whose ends are slightly spaced apart and between which there extends a common armature 90 which may be integrally formed on the lever 72. It will readily be seen that selective energization of the magnets *Ma* and *Ms* will serve to reverse the position of the lever 72 to move the yoke member 62 from its full line positon to its dotted line positon or vice versa.

The end of the operating lever 50 has formed thereon an armature 92 which is adapted to be attracted by an operated magnet *Mo* mounted on a bracket 94 suitably secured to the base plate 10. It will be seen, therefore, that upon energization of the magnet *Mo* the lever 50 will be swung in a clockwise direction against the action of the spring 54 to move the yoke member 62 toward the ratchet disc 28 and index the same in one direction or the other, depending upon the position of the reversing lever 72.

With the reversing lever 72 in its full line position, as shown in Fig. 2, due to a prior energization of the magnet *Ma*, the yoke member 62 will also occupy its full line position. It is to be noted that in such a position of the yoke the end of the pawl finger 64 will occupy a position in close proximity to one of the teeth 30 which has been labeled 30*a*, while the end of the pawl finger 66 will occupy a position relatively remote from the periphery of the ratchet disc 28. Upon energization of the magnet *Mo* and attraction of its armature 92, the operating lever 50 will move from its full line retracted position to its dotted line advanced position, thus projecting the yoke member 62 bodily to the right so that the end of the pawl finger 64 engages the tooth 30*a*. Continued movement of the yoke will then index or step the ratchet disc 28 in a counter-clockwise direction. The yoke member 62 being freely pivoted on the operating lever 50, yet being spring-pressed in a counter-clockwise direction, will, upon continued movement of the yoke to its fully projected position, pivot relative to the lever 50 in a clockwise direction in such a manner that the end of the pawl finger 66 will pass over the tooth labeled 30*b* and eventually move into engagement with the tooth labeled 30*d*. With the end of the finger 64 bearing against the tooth 30*a* and the end of the finger 66 bearing against the tooth 30*d*, further movement of the yoke member 62 becomes impossible and the ratchet disc 28 will then assume a definite angular position wherein one of the numerals 18 is centrally aligned with the window opening 20 of the register 14. The roller 36 on the detent lever 32 will then occupy a position wherein it engages both the teeth 30*e* and 30*f* so that when, upon deenergization of the magnet *Mo*, the spring 54 returns the lever 50 to its retracted position the ratchet disc 28 will retain the position to which it has been moved.

With the lever 72 in its dotted line retracted position, due to a previous energization of the magnet *Ms*, the yoke member 62 will also assume its dotted line position. Upon energization of the magnet *Mo* and consequent movement of the operating lever 50, the end of the pawl finger 66 will engage the tooth 30*b* and continued movement of the yoke member 62 will cause the ratchet disc 28 to be moved in a clockwise direction until such time as the pawl finger 64 engages the tooth 30*g*, at which time the ratchet disc 28 will assume a definite angular position with one of the numerals 18 aligned in the window 20.

The first described indexing operation in effect amounts to an adding operation in the register 14, each indexing operation serving to cumulatively add a unit into the register 14. Similarly, the second described indexing operation of the ratchet disc 28 in effect amounts to a subtracting operation wherein each time the ratchet disc 28 is indexed a numeral is subtracted in the register 14.

Figure 4:
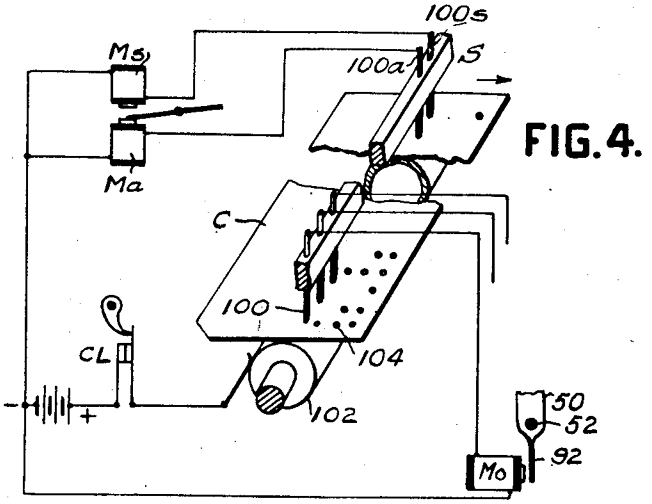
Fig. 4 is a schematic view of the register operating device showing the manner in which it may be operated under the control of a perforated record card. This view is in the form of an electrical diagram.

In Fig. 4 the record controlled operation of the device is shown. The record cards C are successively passed through a sensing station S wherein a sensing brush 100 cooperates with a contact roller 102 to feel or sense the perforations 104 existing in a single card column. The present code employed utilizes a single perforation for each indexing operation of the register 14. Thus, as shown in Fig. 4, three perforations in the first card column are provided when it is desired to add or subtract, as the case may be, three digits into the register 14. Similarly, if eight digits were to be entered into the register 14 the card column would contain eight perforations.

Upon sensing a perforation, the sensing brush 100 will engage the contact roller 102 through the perforation and a circuit will be established from the positive side of the line through a pair of normally open card lever contacts CL which are adapted to become closed when a card exists at the sensing station and through the contact roller 102, sensing brush 100, and magnet Mo to the negative side of the line. Upon energization of the magnet Mo, the operating lever 50 will be actuated to perform the indexing operation, as previously described, in one direction or the other.

The particular direction in which the ratchet disc 28 is moved depends upon the condition of the reversing lever 72 and this in turn depends upon a prior action by one or the other of the magnets *Ma* (add) or *Ms* (subtract). The last two card columns are reserved for the purpose of determining whether an item shall be added into the register 14 or whether it shall be subtracted. If a perforation appears in the column undergoing sensing by the sensing brush 100*a*, it is obvious that the magnet *Ma* will become energized when this perforation is sensed, the circuit existing from the positive side of the line through the card lever contacts CL, contact roller 102, brush 100*a* and magnet *Ma* to the negative side of the line. Upon energization of the magnet *Ma*, the lever 72 will be moved to its full line position, as shown in Fig. 3, and when the indexing operation occurs the item, whatever it may be, is added into the register 14, as previously described. Similarly, if the perforation exists in the column undergoing sensing by the brush 100*s*, a similar circuit exists through the magnet *Ms*, and completion of this circuit causes the lever 72 to be moved to its dotted line position preparatory to effecting a subtracting operation in the register 14.

The invention is not to be limited to the exact arrangement of parts shown in the accompanying drawings or described in this specification as various changes in the details of construction may be resorted to without departing from the spirit of the invention. Furthermore, although the improved operating mechanism has been shown in connection with the reversible operation of a register 14, it is obvious that mechanisms other than a register, as for example, an accumulator in a tabulating machine, or the like, may be similarly operated. Only insofar as the invention has been pointed out in the accompanying claims is the same to be limited.

What is claimed is:

1. Actuating mechanism for periodically indexing a rotatable member in step-by-step fashion in either direction comprising a ratchet wheel operatively connected to the rotatable member in driving relationship, an operating lever pivoted for swinging movement about an axis parallel to the axis of rotation of said ratchet wheel, a yoke member pivotally secured to the free end of said operating lever and having a pair of pawl fingers projecting outwardly therefrom, said operating lever being movable from a retracted position wherein said pawl fingers are out of engagement with the periphery of the ratchet wheel to an advanced position wherein said fingers engage the periphery of said wheel, means normally urging said lever to its retracted position, means for moving said lever to its advanced position, said yoke member being movable when the operating lever is in its retracted position from a position wherein one of the pawl fingers thereon occupies a position in close proximity to the periphery of the ratchet wheel to another position wherein the other pawl finger is in close proximity to the periphery of the ratchet wheel, means selectively and yieldingly urging said yoke member to either of said positions, said yoke member being movable bodily when said operating lever is moved to its advanced position to cause whichever pawl finger is in close proximity to the periphery of the ratchet wheel to engage a tooth on the latter and advance the ratchet wheel in one direction or the other until the other pawl finger engages another tooth on said wheel and blocks further rotational movement thereof thus locking the ratchet wheel in a fixed angular position.

2. Actuating mechanism for periodically indexing a rotatable member in step-by-step fashion in either direction comprising a ratchet wheel operatively connected to the rotatable member in driving relationship, a double-acting pawl including a pair of spaced pawl fingers, said pawl being movable from a retracted position wherein the pawl fingers are out of engagement with the periphery of the ratchet wheel to an advanced position wherein said fingers engage the periphery of the wheel, means normally urging said pawl to its retracted position, means for moving the pawl to its advanced position, said pawl being movable when in its retracted position from a position wherein one of the pawl fingers occupies a position in close proximity to the periphery of the ratchet wheel to another position wherein the other finger is in close proximity to the periphery of the ratchet wheel, means selectively urging said pawl to either of said positions, said pawl when moved from its retracted to its advanced position being operable to cause whichever pawl finger is in close proximity to the periphery of the ratchet wheel to engage a tooth on the latter and advance the ratchet wheel in one direction or the other until the other pawl finger engages a tooth on the ratchet wheel and blocks further rotational movement thereof, thus locking the ratchet wheel in a fixed angular position.

3. A register operating mechanism wherein a rotatable member is turned clockwise or counterclockwise in predetermined increments to control a register comprising, a ratchet wheel arranged to drive the said member, a double acting pawl for actuating the said wheel, the said pawl being adapted to be positioned to rotate the said ratchet wheel in either direction, means for intermittently operating the said pawl, means for retaining the said wheel in any one of a plurality of predetermined register positions between operations of the said operating means, means to position the said pawl to control the direction of rotation of the said wheel, and electro-magnetic means for selectively controlling the said positioning means.

WILLIAM HENNINGER.
HERBERT J. HOLLSBERG.

REFERENCES CITED

The following references are of record in the file of this patent:

UNITED STATES PATENTS

| Number | Name | Date |
|---|---|---|
| 799,217 | Pomeroy | Aug. 15, 1905 |
| 941,354 | Border | Nov. 30, 1909 |
| 1,298,959 | Jones | Apr. 1, 1919 |
| 1,916,997 | Tauschek | July 4, 1933 |
| 2,079,429 | Tauschek | May 4, 1937 |